No. 627,030. Patented June 13, 1899.
G. S. WEBB.
HANDLE BAR.
(Application filed Feb. 25, 1896. Renewed Aug. 6, 1898.)
(No Model.)
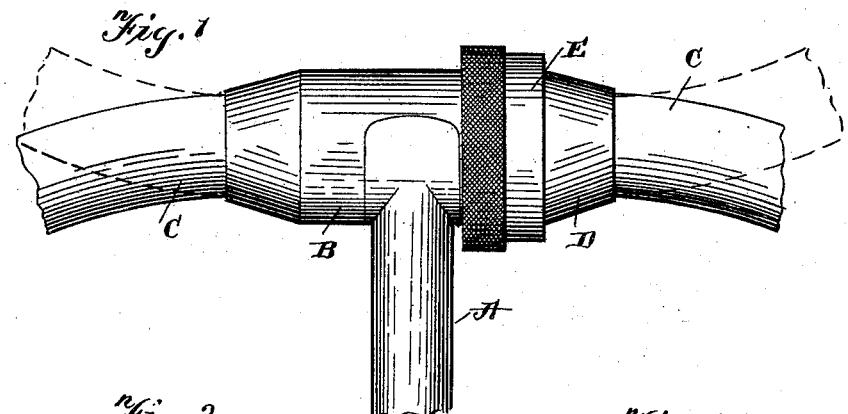
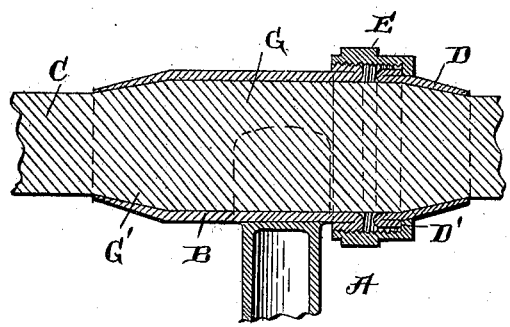
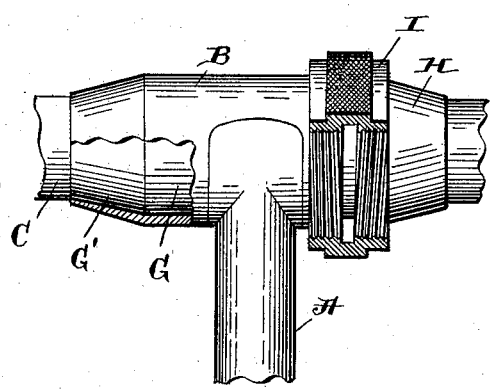
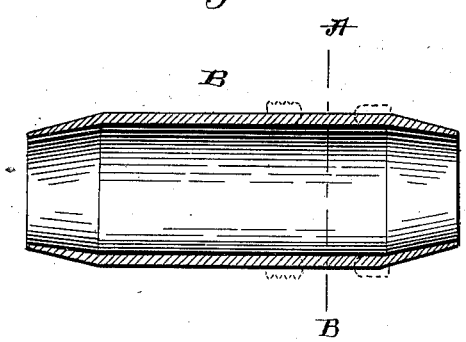
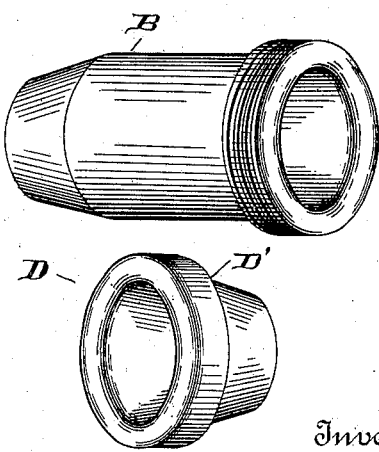
Witnesses
Geo. E. Frech
James W. Evans
Inventor
Geo. S. Webb,
By Attorneys Pattison Nash
THE NORRIS PETERS CO., PHOTO-LITHO., WASHINGTON, D. C.

UNITED STATES PATENT OFFICE.

GEORGE S. WEBB, OF AURORA, ILLINOIS, ASSIGNOR TO GEORGE H. SANFORD AND HENRY R. POLLOW, OF COOK COUNTY, ILLINOIS.

HANDLE-BAR.

SPECIFICATION forming part of Letters Patent No. 627,030, dated June 13, 1899.

Application filed February 25, 1896. Renewed August 6, 1898. Serial No. 687,981. (No model.)

*To all whom it may concern:*

Be it known that I, GEORGE S. WEBB, a citizen of the United States, residing at Aurora, in the county of Kane and State of Illinois, have invented certain new and useful Improvements in Handle-Bars, of which the following is a specification.

The present invention relates to the means for securing a handle-bar to its post or stem; and the object of the invention is to provide improved means for so securing the bar to its stem that it may be adjusted for the purpose of bringing the handles to any desired positions within the possible range of adjustment provided for.

The invention is applicable to both metal and wooden handle-bars; but it is especially adapted for wooden handle-bars.

The invention consists of the features of novelty that are herein described, and in order that it may be fully understood I will describe it with reference to the accompanying drawings, which are made a part of this specification, and in which—

Figure 1 is an elevation of a handle-bar embodying the invention in its preferred form, portions of the handle-bar proper and of the handle-bar stem being broken away. Fig. 2 is a section thereof taken in the common plane of the axes of the central part of the handle-bar and the handle-bar stem. Fig. 3 is a sectional elevation of a handle-bar embodying the invention under a slight modification. Fig. 4 is an axial section of a tube tapered at its ends, from which the hereinafter-described eye or socket and collar are made. Fig. 5 is a perspective view of the said eye or socket and collar separated.

A is a handle-bar stem, and B a tubular eye or socket surmounting the stem and disposed transversely with relation thereto. The stem may be of any desired construction, and it may be secured to the socket in any desired manner, and the socket may be of any desired construction so long as it is tubular and provided with a longitudinally-tapered surface presented inward—*i. e.*, radially—toward the handle-bar, for the purpose hereinafter described. As shown in the drawings and by preference, this longitudinally-tapered surface of the socket B is the result of a contraction at one end of the socket.

C represents the handle-bar, which is movable longitudinally and revoluble in the socket B under certain conditions. The handle-bar is continuous and is provided with a permanent enlargement G, which occupies the socket and is provided with a longitudinally-tapered surface G', which is presented outward—*i. e.*, radially—toward the socket and is complementary to and adapted to engage the longitudinally-tapered surface of the socket. This tapered surface G' is at one end of the enlargement G, the opposite end of the enlargement being similarly tapered and adapted to be engaged by a similarly-tapered surface upon the interior of a collar D. In each instance the engaging tapered surfaces are complementary to each other, so that when the enlargement of the handle-bar is within the socket B and collar D by forcibly drawing the socket and collar toward each other the tapering surface G' of the enlargement is forcibly wedged into the contracted portion of the socket.

I am aware that it has been proposed to couple together the members of a two-part handle-bar and at the same time secure said handle-bar within a socket by means of a threaded sleeve occupying the socket and having right and left threads engaging corresponding threads upon the meeting ends of the two members of the bar, said sleeve being provided with a flared surface engaging a correspondingly-flared surface at one end of the socket, whereby the longitudinal movement of the sleeve into the socket is prevented, so that the rotation of the sleeve will move the two members of the bar longitudinally toward each other, one of said members being provided with an enlargement having a flared surface engaging a correspondingly-flared surface at the other end of the socket. This construction is not the equivalent of my present invention, for the reason that it is applicable only to a two-part handle-bar. It could not be used on a continuous handle-bar without threading the bar from its center quite to one of its ends, for the reason that the sleeve by which the bar is moved longitudinally through the socket does not engage the enlargement of the bar. I believe myself to be the first to provide the socket and the enlargement of the bar with longitudinally-tapered complementary engaging surfaces and to provide means for engaging both the socket and the enlargement for forcibly moving the bar longitudinally in the socket, and thereby forcing together the tapered complementary surfaces of the socket and bar, as distinguished from an arrangement in which the means for forcibly moving the bar longitudinally engages the bar proper and not the enlargement thereof.

The preferred means engaging the enlargement of the bar and the socket for the purpose of forcibly moving the bar endwise consists of the collar D and a nut E, said nut being provided with an inwardly-projecting flange engaging a shoulder D' on the collar D and with internal threads adapted to engage corresponding threads on the socket B. With this arrangement the nut has swivel connection with the collar D and threaded connection with the socket, so that by turning it in the proper direction the collar D is drawn toward the end of the socket. This movement of the collar D while in engagement with the enlargement of the handle-bar will cause the handle-bar to be moved longitudinally through the socket and force the flared surface G' of the enlargement into the contracted end of the socket. Another means for accomplishing the same result is a nut I, having right and left threads engaging corresponding right and left threads on the socket B and collar H, as shown in Fig. 3, the collar H of Fig. 3 being in all respects similar to the collar D of Figs. 1, 2, and 6, excepting that in Fig. 3 the collar is provided with a thread, while in the other figures it is not.

Preferably the socket B and collar D are made by cutting upon the line A B, Fig. 4, a tube having its ends contracted and thereafter turning the severed end of each of the parts thus formed back upon itself, as indicated by dotted lines in Fig. 4.

What I claim as new, and desire to secure by Letters Patent, is—

1. The combination of a stem, a transverse tubular socket carried thereby, said socket being open only at its ends and being provided at one end with a longitudinally-tapered surface presented inward, a continuous handle-bar movable longitudinally and revoluble in the socket, said handle-bar having a circumferential enlargement occupying the socket and provided at one end with an outwardly-presented longitudinally-tapered surface complementary to and engaging the tapered surface of the socket, and means engaging both the socket and the enlargement of the handle-bar for forcibly moving the bar longitudinally in the socket and thereby forcing together the tapered complementary surface of the socket and enlargement, substantially as set forth.

2. The combination of a stem, a transverse tubular socket carried thereby, said socket being open only at its ends and provided with a longitudinally-tapered surface presented inward, a continuous handle-bar movable longitudinally and revoluble in the socket, said handle-bar having a circumferential enlargement occupying the socket and provided at one end with an outwardly-presented longitudinally-tapered surface complementary to and engaging the tapered surface of the socket, and means engaging both the socket and the enlargement for forcibly moving the bar longitudinally in the socket and thereby forcing together the tapered complementary surface of the socket and enlargement, said means including a nut having threaded engagement with one of the parts so that when turned in the proper direction it will exert force in one direction against the socket and in the other direction against the enlargement, substantially as set forth.

3. The combination of a stem, a transverse tubular socket carried thereby, said socket being open only at its ends and provided at one end with a longitudinally-tapered surface presented inward, a continuous handle-bar movable longitudinally and revoluble in the socket, said handle-bar having a circumferential enlargement occupying the socket and provided at one end with an outwardly-presented longitudinally-tapered surface complementary to and engaging the tapered surface of the socket, a collar engaging the opposite end of the enlargement, and a nut coupling the collar and socket and adapted when turned in one direction to draw the socket and collar together and thereby force the tapered complementary surfaces of the socket and collar together, substantially as set forth.

4. The combination of a stem, a transverse tubular socket carried thereby and open at both ends, one end of the socket being contracted while the other is not, a handle-bar movable longitudinally and revoluble in the socket and having a circumferential enlargement occupying the socket adapted to fit the socket and stop the further movement of the bar by engaging the contracted end of the socket, and a locking device engaging the uncontracted end of the socket and the corresponding end of the enlargement for confining the bar, substantially as set forth.

5. The combination of a tapering tubular socket, a continuous handle-bar extending therethrough and having a circumferential enlargement occupying the socket tapered at each end, one of the tapering ends of the enlargement being in engagement with the correspondingly-tapered end of the socket, a collar engaging the opposite tapered end of the enlargement, and a nut engaging the collar and socket, substantially as set forth.

6. The combination of a tubular socket having one end turned backward upon itself and screw-threaded exteriorly, a handle-bar, and a lock-nut carried by the handle-bar and having internal threads engaging threads on the socket, substantially as set forth.

7. The combination of a tubular socket, a handle-bar extending therethrough, a sleeve surrounding the handle-bar having one of its ends turned backward upon itself, and a lock-nut engaging the backwardly-turned portion on the socket, and means whereby the endwise movement of the nut is transmitted to the handle-bar, substantially as set forth.

In testimony whereof I affix my signature in presence of two witnesses.

GEORGE S. WEBB.

Witnesses:
A. H. SWITZER,
JOHN KELLEY.